2,769,271

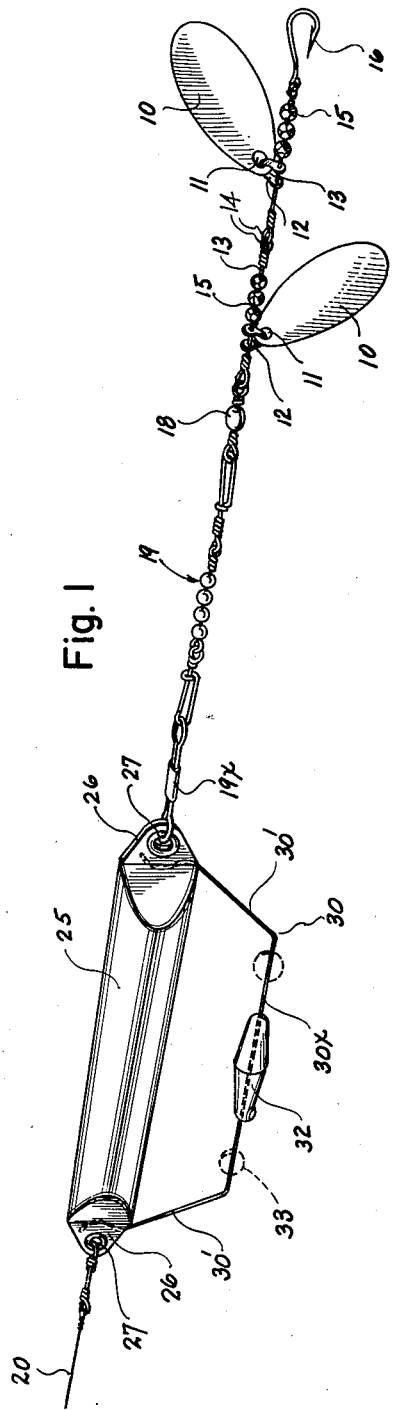
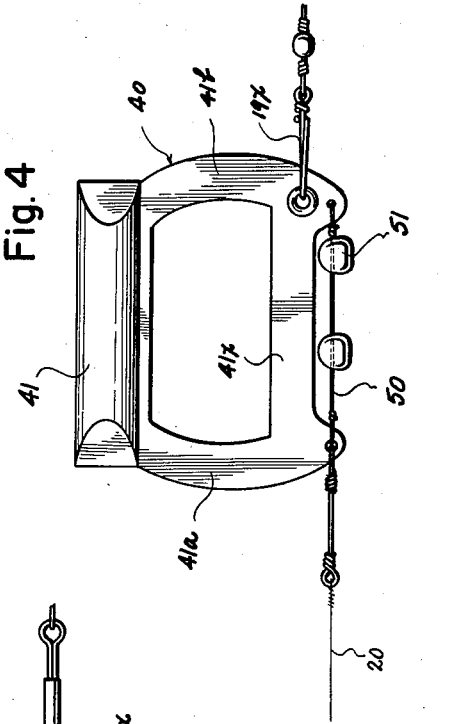
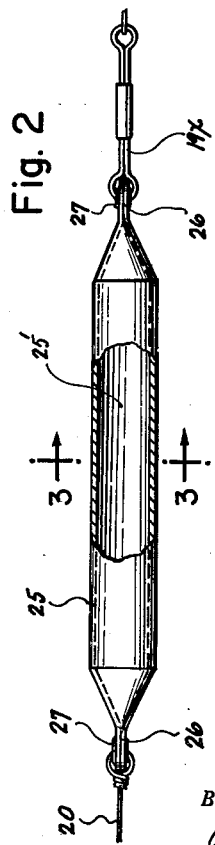
Fig. 1 Fig. 4 Fig. 2 Fig. 3
INVENTOR.
Eric M. Smith United States Patent Office 2,769,271
Patented Nov. 6, 1956

COMBINED ANTI-TWIST RUDDER AND FLOAT FOR USE WITH FISHING LURES

Eric M. Smith, Seattle, Wash.

Application February 8, 1954, Serial No. 408,709

6 Claims. (Cl. 43—43.13)

This invention relates to fishing lures, and has reference more particularly to devices designed for use in connection with fishing lures of the spinner types, and which devices I designate as "anti-twist rudders." More specifically defined, the invention resides in a combined float and weighted, suspended keel to be used in connection with a line and lure for trolling, and which has for its purpose to establish the approximate operating depth of the lure and hook and also to prevent the line being twisted under any twisting influence that may be imparted thereto by the spinning of the parts comprised by the lure as it is drawn through the water.

It is the principal object of this invention to provide a combination float and weighted keel whereby the lure, as used in a fishing operation, will be supported at a predetermined depth, and whereby the turning or line twisting influence of the spinners, or other fish attracting devices used with the lure, will be counter-acted or nullified.

More specifically stated, the present invention resides in the incorporating of a simple, effective float in the connection between line and lure, and to apply a keel member of novel kind thereto, that is weighted in such a manner as to effectively resist any rotating influence imparted thereto by the action of the lure that, if not so resisted, would cause the line to become twisted.

Further objects and advantages of the invention reside in the details of construction of the various parts embodied in the present combination, and in their relationship and function in use, as will hereinafter be fully described.

In accomplishing these and other objects of the invention, I have provided the improved details of construction, the preferred forms of which are illustrated in the accompanying drawings, wherein:

Fig. 1 is a perspective view showing a float with weighted keel, embodied by the present invention, and as used in combination with a trolling line and lures of spinner type.

Fig. 2 is a top view of the float and keel member, with a part of the float body broken away to show its hollow form.

Fig. 3 is a cross-section of the float and keel taken on line 3—3 in Fig. 2.

Fig. 4 is a side view of a float and keel of an alternative form of construction.

Referring more in detail to the drawings:

In Fig. 1, I have shown a fishing lure as comprised by the two spinners or spoons 10 and 10 arranged in tandem. Each spoon is here illustrated as being substantially of oval form, apertured at one end, as at 11, and secured by a U-type hanger 12 passed through the aperture, to a wire or other suitable stringer 13. The two wires 13 are joined by inter-looped twisted eyes 14 and each wire is shown to have a plurality of light reflecting beads 15 threaded thereon. At the trailing end of the connected wires, a fish hook 16 is attached and at its forward end, the assembly is here shown to be joined by a swivel 18 to a succession of wires and links constituting a connector which is designated in its entirety by numeral 19.

A fish line, or trolling line, is designated in the various views by reference numeral 20 and it is shown to be joined to the forward link 19x of the connector 19 through the mediacy of the present float, designated in its entirety by numeral 25, which will now be described.

Although the float might comprise any suitably buoyant body of material, it is here illustrated as of tubular form and closed at its opposite ends to provide an air and watertight chamber 25' therein. Preferably, the float is formed from a straight length of plastic tubing, and in the closing of its opposite ends, the opposite side portions of the tube adjacent its ends are pressed together and the joint sealed, thus by this operation also providing flattened ears, or flanges, 26—26, at the opposite ends of the float. These ears are punched, and fitted with eyelets 27—27 for easy attachment of the line 20 and link 19x thereto.

The keel portion of the device is designated in its entirety by reference numeral 30. It is of yoke form and is fixed rigidly to the float and depends therefrom. This keel forming yoke comprises a single piece of steel wire, preferably with a straight base portion 30x, and opposite end portions, or legs, designated at 30' and 30'; these being directed upwardly and outwardly from the opposite ends of the base portion, and embedded at their upper ends in the ears 26—26 of the float. As indicated in Fig. 1, the base member 30x of this yoke extends parallel with the float 25, and depends below it and, with its end portions 30'—30', constitutes a sort of keel.

Mounted on the base member 30x of the keel, is a weight 32, of a predetermined value, designed to keep the float at a desired depth below surface level. If it is desired or found necessary, the weight 32 can be changed for one of lesser or greater weight or supplemented by additional weights such as those designated at 33, in dotted lines. These weights combined with the float establish a resisting moment against axial rotation of the float in the water.

In the modified form of device shown in Fig. 4, a flat keel 40 is attached to a tubular float 41. The float may be substantially like that of Fig. 1, or it may be of any suitable buoyant material of the same general outline. The keel 40 is made of flat material, and has its central body portion cut away leaving the lower edge bar 41x and opposite end legs 41a—41b. The fish line 20 is connected by link 20' to the lower end portion of leg 41a and a lure trailing linkage 19 is joined by link 19x to the rear end of the bar 41b.

A taut wire 50, connected at its forward and rearward ends to the lower terminal portions of legs 41a—41b, which extend below the level of bar 41x, carries appropriate weights 51 to give the desired moment of resistance to rotation of the float 41 and keep it at a desired depth below surface level.

Such devices, as in Fig. 1 or Fig. 4, are relatively inexpensive, effective in use for their intended purposes, and also are beneficial in the attracting of fish. They may be made in various sizes, to meet requirements, and of the materials found to be satisfactory. The type of lure used with this float and rudder is of no particular significance; it being the function of the combined float and keel to resist any twisting tendency imparted to the line by whatever lure may be used, and also to establish a desired working depth for the lure.

Having thus described my invention, what I claim as new therein and desire to secure by Letters Patent is:

1. An anti-twist rudder of the character described comprising an elongated float, equipped at its forward end with means for its connection to a fishing line, and equipped at its rearward end with means for the attachment of a trailing fishing lure thereto, and a keel depending from the float and comprising a base member with leg portions extending upwardly therefrom at its opposite ends and said legs being fixed at their upper ends to said float, said base member being spaced a substantial distance from the float, a weight applied in fixed position to said base member to establish a moment of resistance against axial rotation of the float under influence of the lure, when drawn through the water by a fish line and said weight being of sufficient size to control the depth of the float in the water.

2. An anti-twist rudder as recited in claim 1 wherein said base member comprises a single piece of wire, with the leg portions fixed rigidly to the float and with the base member extended lengthwise of the float body.

3. An anti-twist rudder as recited in claim 2 wherein the said elongated float comprises a tubular body, and wherein said leg portions of said yoke are fixedly secured at their upper ends in the opposite end portions of the float.

4. A device as recited in claim 1, wherein the said elongated float comprises a plastic tube with opposite sides of its opposite end portions pressed flatly together and sealed in air and watertight joints.

5. A device as recited in claim 1 wherein the float comprises a plastic tube with opposite sides of its opposite end portions pressed flatly together and sealed in air and water tight joints, and the sealed end portions of said tube having eyelets formed therethrough to provide for the line and lure connections.

6. In combination, a fish line, a fish lure of spinner type, and a combined anti-twist float and keel joining said line and lure; said float comprising an elongated, buoyant body, formed with an eyelet in its forward end portion through which a line connector is applied, and with an eyelet in its rearward end through which a lure connector is applied, and a keel secured to the float and substantially spaced therefrom; said keel comprising a base portion extending parallel with the float, and having upwardly directed legs at its ends affixed at their ends to the opposite end portions of the float, a weight applied to the said base member to establish a moment of resistance to rotation of the lure as drawn through the water and said weight being of sufficient size to control the depth of the float in the water.

References Cited in the file of this patent

UNITED STATES PATENTS

| | | |
|---|---|---|
| 1,304,983 | Howerton | May 27, 1919 |
| 1,857,939 | Cameron | May 10, 1932 |
| 2,327,789 | Hixon | Aug. 24, 1943 |
| 2,522,179 | Jensen et al. | Sept. 12, 1950 |
| 2,595,947 | Jones | May 6, 1952 |

FOREIGN PATENTS

| | | |
|---|---|---|
| 893,581 | France | Feb. 7, 1944 |